United States Patent
Coban et al.

(10) Patent No.: US 9,838,684 B2
(45) Date of Patent: Dec. 5, 2017

(54) WAVEFRONT PARALLEL PROCESSING FOR VIDEO CODING

(71) Applicant: QUALCOMM Incorporated, San Diego, CA (US)

(72) Inventors: Muhammed Zeyd Coban, Carlsbad, CA (US); Ye-Kui Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 13/776,071

(22) Filed: Feb. 25, 2013

(65) Prior Publication Data

US 2013/0272370 A1    Oct. 17, 2013

Related U.S. Application Data

(60) Provisional application No. 61/622,974, filed on Apr. 11, 2012, provisional application No. 61/640,529, filed on Apr. 30, 2012.

(51) Int. Cl.
*H04N 7/26* (2006.01)
*H04N 19/436* (2014.01)
(Continued)

(52) U.S. Cl.
CPC ....... *H04N 19/00521* (2013.01); *H04N 19/17* (2014.11); *H04N 19/174* (2014.11); *H04N 19/436* (2014.11)

(58) Field of Classification Search
None
See application file for complete search history.

(56) References Cited

U.S. PATENT DOCUMENTS

| 9,635,396 B2 | 4/2017 | Wang et al. |
| 2007/0269181 A1 | 11/2007 | Kikuchi |

(Continued)

FOREIGN PATENT DOCUMENTS

| CN | 101981934 A | 2/2011 |
| JP | 2002027465 A | 1/2002 |

(Continued)

OTHER PUBLICATIONS

Alvarez-Mesa et al., "Parallel video decoding in the emerging HEVC standard", IEEE International Conference on Acoustics, Speech and Signal Processing (ICASSP), Mar. 25, 2012-Mar. 30, 2012, pp. 1545-1548, XP032227426, DOI: 10.1109/ICASSP.2012, ISBN: 978-1-4673-0045-2, http://iphome.hhi.de/schierl/assets/hevc_icassp2012.pdf, 4 pp.

(Continued)

*Primary Examiner* — Andy Rao
*Assistant Examiner* — Samuel D Fereja

(57) ABSTRACT

In one example, a video coder may be configured to determine that a slice of a picture of video data begins in a row of coding tree units (CTUs) in the picture at a position other than a beginning of the row. Based on the determination, the video coder may be further configured to determine that the slice ends within the row of CTUs. The video coder may be further configured to code the slice based on the determination that the slice ends within the row of CTUs.

36 Claims, 6 Drawing Sheets

(51) Int. Cl.
*H04N 19/174* (2014.01)
*H04N 19/17* (2014.01)

(56) References Cited

U.S. PATENT DOCUMENTS

| | | | |
|---|---|---|---|
| 2011/0170610 A1* | 7/2011 | Min et al. | 375/240.24 |
| 2012/0014440 A1 | 1/2012 | Segall et al. | |
| 2012/0082218 A1* | 4/2012 | Misra et al. | 375/240.12 |
| 2012/0082238 A1 | 4/2012 | Panusopone et al. | |
| 2012/0106622 A1* | 5/2012 | Huang et al. | 375/240.01 |
| 2012/0106652 A1* | 5/2012 | Huang | H04N 19/70 375/240.25 |
| 2012/0230397 A1* | 9/2012 | Ouedraogo et al. | 375/240.03 |
| 2012/0287993 A1* | 11/2012 | Priddle et al. | 375/240.12 |
| 2013/0113880 A1* | 5/2013 | Zhao et al. | 348/43 |
| 2016/0165250 A1 | 6/2016 | Zhao et al. | |

FOREIGN PATENT DOCUMENTS

| | | |
|---|---|---|
| RU | 2407217 C2 | 11/2009 |
| WO | 2012011858 A1 | 1/2012 |
| WO | 2012011860 A1 | 1/2012 |

OTHER PUBLICATIONS

Fogg, C. et al., "HEVC Profile & Level limits, for parallel partitions in particular", 7. JCT-VC Meeting; 98. MPEG Meeting; Nov. 21-30, 2011; Geneva, CH; (Joint Collaborative Team on Video Coding of ITU-T SG.16 WP3 and ISO/IEC JTC1/SC29/WG11); URL: HTTP://WFTP3.1TU.INT/AV-ARCH/JCTVC-SITE/, No. JCTVC-G661, Nov. 9, 2011 (Nov. 9, 2011), XP030110645, 4 pp.
International Search Report and Written Opinion—PCT/US2013/027760—ISA/EPO—Jun. 11, 2013, 12 pp.
Lee et al., "Simplification on tiles and slices", JCT-VC Meeting; MPEG Meeting; Feb. 1-10, 2012, San Jose, CA; (Joint Collaborative Team on Video Coding of ITU-T SG.16 WP3 and ISO/IEC JTC1/SC29/WG11); URL: HTTP://WFTP3.1TU.INT/AV-ARCH/JCTVC-SITE/, No. JCTVC-H0348, XP030111375, 10 pp.
McCann et al., "HM4: High Efficiency Video Coding (HEVC) Test Model 4 Encoder Description", MPEG Meeting; Jul. 14-22, 2011; Torino, IT; (Motion Picture Expert Group or ISO/IEC JTC1/SC29/WG11), No. N21450, XP030050013, 36 pp.
Fuldseth, et al., "Tiles," JCTVC-F335, Source: Cisco Systems, eBrisk Video, Sharp, and Texas Instruments, ITU-T SG16 WP3 and ISO/IEC JTC1/SC29/WG11, 6th Meeting: Torino, IT, Jul. 14-22, 2011, 15 pp.
Fuldseth et al., "Tiles," Joint Collaborative Team on Video Coding, JCTVC-F335 PowerPoint, Jul. 14-22, 2011, 12 slides.
Clare et al., "Wavefront and Cabac Flush: Different Degrees of Parallelism Without Transcoding," Joint Collaborative Team on Video Coding, JCTVC-F275 PowerPoint, Jul. 14-22, 2011, 12 slides.
Clare et al., "Wavefront and Cabac Flush: Different Degrees of Parallelism Without Transcoding," Source: Orange Labs, JCTVC-F275, ITU-T SG16 WP3 and ISO/IEC JTC1/SC29/WG11, 6th Meeting: Torino, IT, Jul. 14-22, 2011, 11 pp.
Clare et al., "Wavefront Parallel Processing for HEVC Encoding and Decoding," JCTVC-F274, Source: Orange Labs, ITU-T SG16 WP3 and ISO/IEC JTC1/SC29/WG11, 6th Meeting: Torino, IT, Jul. 14-22, 2011, 16 pp.
Clare et al., "Wavefront Parallel Processing," Joint Collaborative Team on Video Coding, JCTVC-F274 PowerPoint, Jul. 14-22, 2011, 18 slides.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union, Jun. 2011, 674 pp.
Reply to Written Opinion dated Jun. 11, 2013, from international application No. PCT/US2013/027760, dated Feb. 7, 2014, 12 pp.
Iain E Richardson, H.264 and MPEG-4 Video Compression, chapter 6, H.264/MPEG4 Part 10, Oct. 17, 2003, XP030001626, 65 pp.
Henry et al., "Wavefront Parallel Processing," JCT-VC Meeting; MPEG Meeting; Mar. 16-23, 2011, Geneva, CH, Joint Collaborative Team on Video Coding (JCT-VC) of ITU-T SG16 WP3 and ISO/IEC JTC1/SC29/WG11, No. m19714, JCTVC-E196, Mar. 16, 2011, 8 pp.

* cited by examiner

WAVEFRONT PARALLEL PROCESSING FOR VIDEO CODING

This application claims the benefit of U.S. Provisional Application Ser. Nos. 61/622,974, filed Apr. 11, 2012, and 61/640,529, filed Apr. 30, 2012, the entire contents of each of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. Extensions of standards include, for example, Scalable Video Coding (SVC) and Multiview Video Coding (MVC) extensions of H.264/AVC. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for parallel processing of wavefronts of a picture. In particular, in accordance with certain techniques of this disclosure, a video coder may be configured to code video data for a picture having one or more wavefronts, each of the wavefronts including one or more complete slices. As another example, in accordance with certain techniques of this disclosure, a video coder may be configured to code video data for a picture having one or more slices, each of the slices including one or more wavefronts. In either case, each wavefront in a plurality of wavefronts may include sufficient information to allow for parallel processing of the wavefronts. Thus, a wavefront may either always begin with a slice header, or if the wavefront does not begin with a slice header, then the wavefront belongs to the same slice as a row of blocks above the wavefront.

In one example, a method includes determining that a slice of a picture of video data begins in a row of coding tree units (CTUs) in the picture at a position other than a beginning of the row, based on the determination, determining that the slice ends within the row of CTUs, and coding the slice based on the determination that the slice ends within the row of CTUs.

In another example, a device for coding video data includes a video coder configured to determine that a slice of a picture of video data begins in a row of coding tree units (CTUs) in the picture at a position other than a beginning of the row, based on the determination, determine that the slice ends within the row of CTUs, and code the slice based on the determination that the slice ends within the row of CTUs.

In another example, a device for coding video data includes means for determining that a slice of a picture of video data begins in a row of coding tree units (CTUs) in the picture at a position other than a beginning of the row, means for determining, based on the determination, that the slice ends within the row of CTUs, and means for coding the slice based on the determination that the slice ends within the row of CTUs.

In another example, a computer-readable storage medium has stored thereon instructions that, when executed, cause a programmable processor of a computing device to determine that a slice of a picture of video data begins in a row of coding tree units (CTUs) in the picture at a position other than a beginning of the row, based on the determination, determine that the slice ends within the row of CTUs, code the slice based on the determination that the slice ends within the row of CTUs.

The details of one or more examples are set forth in the accompanying drawings and the description below. Other features, objects, and advantages will be apparent from the description and drawings, and from the claims.

DETAILED DESCRIPTION

Figure 1:
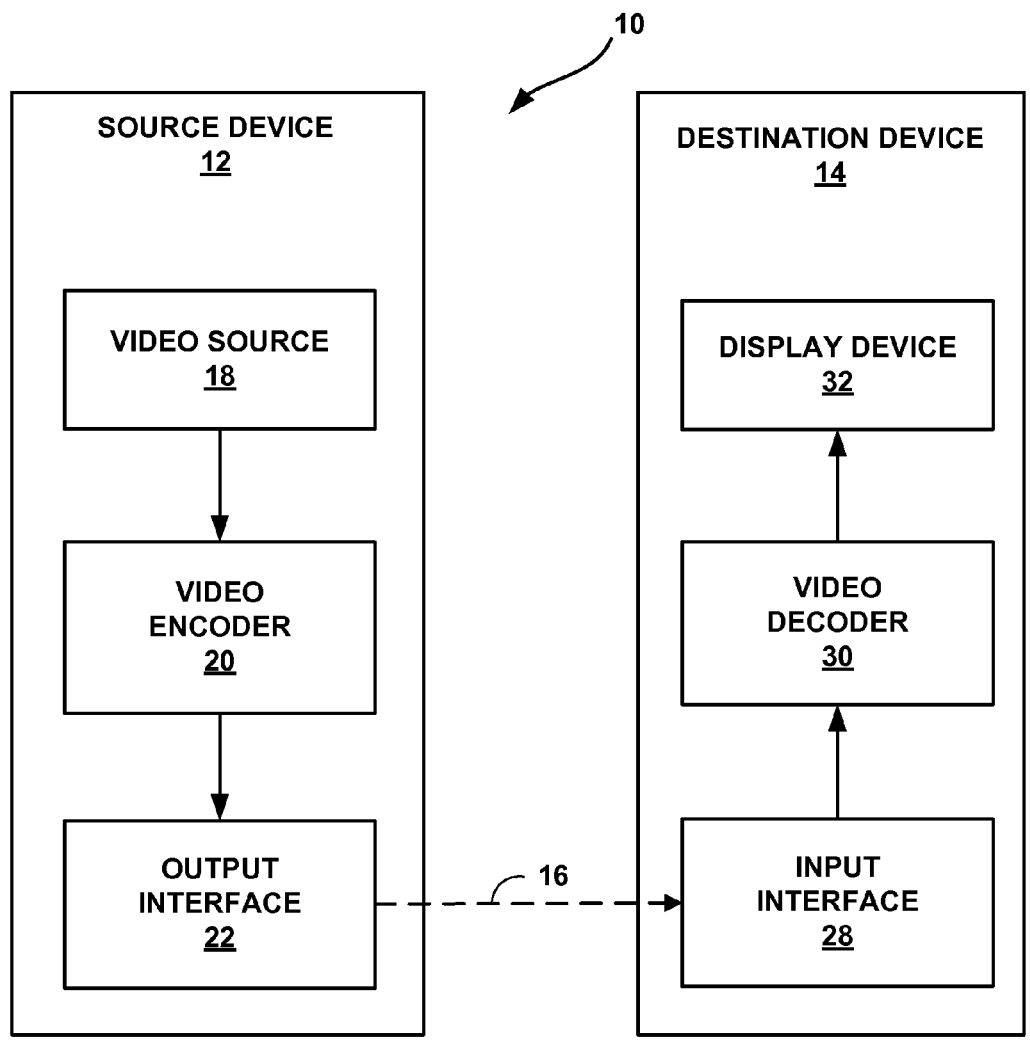
FIG. 1 is a block diagram illustrating an example video encoding and decoding system that may utilize techniques for coding wavefronts in parallel.

In general, this disclosure describes techniques for parallel processing of wavefronts of a picture. A picture may be partitioned into a plurality of wavefronts, where each wavefront may correspond to a row of blocks of the picture. In examples, the blocks may correspond to coding tree units (CTUs) of the picture, also referred to as largest coding units (LCUs). A video coder, such as a video encoder or video decoder, may code the wavefronts substantially in parallel. For example, the video coder may code a block of a first wavefront of a picture in parallel with a block of a second wavefront of the picture. The video coder may initialize a context for a current wavefront for performing context adaptive binary arithmetic coding (CABAC) of the current wavefront based on data of the first two blocks of the above wavefront, as well as one or more elements of a slice header for a slice including the first block of the current wavefront.

A picture may be divided into multiple rows of coding tree units (CTUs). Each row of CTUs may correspond to a respective wavefront. Wavefront parallel processing offers the capability to process multiple rows of CTUs in parallel in a wavefront fashion, where there may be a delay of two CTUs between the start of adjacent wavefronts. The video coder may perform CABAC initialization of a subsequent wavefront (or CTU row) using the context states after coding 2 CTUs of a CTU row above the subsequent CTU row. In other words, before beginning coding of a current wavefront, a video coder may code at least two blocks of a wavefront above the current wavefront, assuming the current wavefront is not the top row of CTUs of a picture. Moreover, the video coder may initialize a CABAC context for a current wavefront after coding at least two blocks of a wavefront above the current wavefront.

CABAC probabilities may be synchronized with an upper-right CTU. Because a video coder may process wavefronts in parallel, the video coder may require information from the top CTU row's end to decode the beginning of the second CTU row. Examples of such information may include slice information, quantization parameters (QP), and the like. For example, if a new slice starts towards the end of the top CTU row (wavefront), the video coder may require certain information of the top CTU row prior to coding the CTU row (wavefront) immediately below. More specifically, the information from the top CTU row may affect the decoding process of the CTU row below.

In general, the techniques of this disclosure are directed to mitigating potential issues caused by slices that begin in a position that is after the first CTU of a wavefront, and continue into a subsequent wavefront. In particular, if a slice begins at a position subsequent to the first CTU of a wavefront, and includes CTUs of one or more subsequent wavefronts, the video coder may need to code the respective slice headers of each slice of a current wavefront in order to obtain the information required to code the current wavefront. In such a scenario, based on the slice headers encoded by a video encoder, a video decoder may be required to examine each slice header in a picture to determine information necessary to decode the various wavefronts of the picture. Examples of such information include entry points of the wavefronts, quantization parameters for the wavefronts, etc. In some instances, the video coder may be required to map the slices according to positions in the picture, such as mapping the beginning and end point of each slice within the picture. On the other hand, if the video coder has information for a current wavefront from within 2 CTUs to the right of the current CTU from the above row, then the video coder may code each wavefront without delay caused by slice spillover. For instance, if a video decoder, or a video encoder configured to perform decoding, has access to information for a current wavefront from within 2 CTUs to the right of the current CTU from the above row, then the video decoder may decode each wavefront without delay caused by slice spillover To mitigate or prevent coding delays caused by slice spillover, a video coder may implement one or more techniques of this disclosure to restrict wavefront-slice interaction such that if a slice begins at a position of a CTU row other than the beginning of the CTU row (e.g., the slice begins at the middle of the CTU row), then the slice ends within the CTU row (e.g., at the last CTU of the row, or at a CTU preceding the last CTU of the row). Conversely, the video coder may implement the techniques to determine that a slice begins at the beginning of a CTU row (e.g., the first CTU of the row forms the first CTU of the slice), and that the slice includes all CTUs of the current row and one or more CTUs of one or more subsequent CTU rows. In this scenario, the video coder may permit slice spillover, i.e., the video coder may determine that the slice includes one or more CTUs of the one or more subsequent CTU rows. A potential advantage provided by the techniques of this disclosure is that a video decoder may not be required to rely on subsequent slice headers while decoding a picture in wavefront parallel processing order. Instead, the decoder may process each slice header that the video decoder encounters while processing the CTUs in wavefront parallel processing order.

In some examples, the video coder may detect that a slice begins in the middle or at the end of a wavefront (e.g., at a block subsequent to the first block of the wavefront), and crosses the boundary to the subsequent wavefront. In this instance, the video coder may configure the slice to terminate within (e.g., at the last block of) the wavefront in which the slice begins. Using the slice-wavefront configurations described above, a video coder may ensure that a wavefront either starts with a slice header, or alternatively, if the wavefront does not start with a slice header, then the wavefront belongs to the same slice as a wavefront positioned immediately above.

In some examples, a video coder may implement the techniques to require that that, if a slice starts at the beginning of a wavefront and continues into a subsequent wavefront, then the slice must end in the middle of (or otherwise within) a wavefront. In combination with the restrictions described above, the video coder may ensure that the remainder of the wavefront in which the first slice ends includes one or more complete slices. By configuring slices and wavefronts according to these requirements, a video coder may implement techniques to perform wavefront parallel processing of an image more efficiently, such as by mitigating delays caused by spillover of slices that begin after a first block of a wavefront.

FIG. 1 is a block diagram illustrating an example video encoding and decoding system 10 that may utilize techniques for coding wavefronts in parallel. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding wavefronts in parallel. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding wavefronts in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or coding tree units (CTUs) that include both luma and chroma samples. Syntax data within a bitstream may define a size for the CTU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned CTU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or CTU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 and video decoder 30 may use wavefront parallel processing (WPP) to encode and decode pictures, respectively. To code a picture using WPP, a video coder, such as video encoder 20 and video decoder 30, may divide the coding tree units (CTUs) of the picture into a plurality of wavefronts. Each wavefront may correspond to a different row of CTUs in the picture. The video coder may start coding a top wavefront, e.g., using a first coder core or thread. After the video coder has coded two or more CTUs of the top wavefront, the video coder may start coding a second-to-top wavefront in parallel with coding the top wavefront, e.g., using a second, parallel coder core or thread. After the video coder has coded two or more CTUs of the second-to-top wavefront, the video coder may start coding a third-to-top wavefront in parallel with coding the higher wavefronts, e.g., using a third, parallel coder core or thread. This pattern may continue down the wavefronts in the picture.

This disclosure refers to a set of CTUs that a video coder is concurrently coding, using WPP, as a "CTU group." Thus, when the video coder is using WPP to code a picture, each of the CTUs of the CTU group may be in a different wavefront of the picture and each of the CTUs of the CTU group may be vertically offset from a CTU in a respective, above wavefront by at least two columns of CTUs of the picture.

Furthermore, when coding the picture using WPP, the video coder may use information associated with one or more spatially-neighboring CUs outside a particular CTU to perform intra or inter prediction on a particular CU in the particular CTU, so long as the spatially-neighboring CUs are left, above-left, above, or above-right of the particular CTU. When the one or more spatially-neighboring CUs are above-right of the particular CTU, it is also assumed that the one or more spatially-neighboring CUs were previously coded. If the particular CTU is the leftmost CTU in a wavefront other than the topmost wavefront, the video coder may use information associated with the first and/or second CTUs of an adjacent wavefront (e.g., the wavefront positioned immediately above) to select a coding context for entropy coding syntax elements of the particular CTU. If the particular CTU is not the leftmost CTU in the wavefront, the video coder may select from information associated with a spatially-neighboring CU, that is positioned to the left, above-left, above, and/or above-right of the particular CTU to select a coding context for entropy encoding a syntax element of the particular CTU. In this way, the video coder may initialize entropy coding (e.g., CABAC) states of a wavefront based on the entropy coding states of the wavefront positioned immediately above after encoding two or more CTUs of the wavefront positioned immediately above.

Additionally, a video coder may partition an image into slices. In general, each slice is individually entropy coded, such that contexts are reset at the beginning of coding a new slice. Video encoder 20, or a post-processing unit of source device 12 (such as an encapsulation unit, not shown in FIG. 1), may encapsulate slices into respective network abstraction layer (NAL) units. For instance, a NAL unit may include a NAL header and a payload that represents one or more encoded slices. To demarcate encoded slices from one another, video encoder 20 may include slice headers within the NAL unit payload to indicate the beginning of a slice. Additionally, video encoder 20 may include one or more end-of-slice symbols within the NAL unit payload to indicate the end of distinct encoded slices.

Video encoder 20 may partition a given image into slices of varying lengths. In other words, different slices of a particular image may include or otherwise correspond to varying numbers of CTUs. As a result, video encoder 20 may generate different NAL units to include different numbers of encoded slices.

Correspondingly, video decoder 30 may entropy decode the image slice by slice. More specifically, source device 22 may use output interface 22 to transmit the NAL units to input interface 28 of destination device 14. Alternatively, output interface 22 may output NAL units onto a computer-readable medium, such as a disc or computer-readable memory, e.g., magnetic memory or flash memory. Video decoder 30 may receive the NAL units via input interface 28, and extract each encoded slice using the included slice partition information (e.g., slice headers and/or the end-of-slice symbols). In turn, video decoder 30 may entropy decode each extracted slice, and reconstruct the image slice by slice.

In the context of WPP, under some circumstances, a video coder might not be capable of selecting coding contexts across slice boundaries. For example, if context information for a particular CTU belongs to a different slice than the CTU positioned to the above-right of the particular CTU, the video coder may not have access to the information necessary to code the particular CTU. More specifically, in terms of positioning within wavefronts, the slice header for the particular CTU may not be coded when the video coder reaches the particular CTU. For instance, the slice header may be positioned in a wavefront that is immediately above the wavefront of the CTU, and the slice header may be positioned more than two blocks to the right in comparison to the particular CTU. In this example, the video coder may have access to the spatially-neighboring CUs from which the video coder may draw context for coding the particular CTU. However, the video coder may not yet have coded the slice header corresponding with the particular CTU, and thus may not be capable of coding the particular CTU until the slice header is coded. As a result, the video coder may be required to code additional blocks of the preceding wavefront (i.e., until the slice header is coded), before beginning to code the particular CTU. In this scenario, the video coder is unable to avail of the advantages of WPP, such as coding the particular CTU in parallel with a CTU positioned to the above-right.

Rather than allowing a slice to cross a wavefront boundary when the slice starts in the middle of the wavefront, a video coder may implement the techniques of this disclosure to restrict the coding process such that when a slice begins at any point after the beginning (i.e., the first CTU) of a wavefront, the slice ends within that wavefront. For ease of discussion purposes only, any point after the beginning of a wavefront is generally referred to herein generically as the "middle" of the wavefront. That is, the "middle" of the wavefront as used herein is not necessarily the midpoint, but any CTU (or any block) of a wavefront other than the ordinal first block of the wavefront. Such a slice may also be said to begin "within" the wavefront.

For example, video encoder 20 may determine that a slice header occurs within the middle of a wavefront, and that the slice includes all remaining CTUs of the wavefront as well as at least one CTU of the wavefront positioned immediately below. In response, video encoder 20 may insert an end-of-slice symbol upon finishing entropy encoding of a CTU up to or including the last CTU of the wavefront. That is, video encoder 20 may ensure that such a slice ends within the wavefront in which the slice begins, such that the slice does not cross wavefront boundaries when the slice begins at a block other than the ordinal first block of the wavefront. Additionally, video encoder 20 may insert a slice header after the end-of-slice symbol, thereby indicating that the next wavefront (e.g., the wavefront positioned immediately below) corresponds to the beginning of a new encoded slice. Similarly, when entropy decoding an image in accordance with WPP, video decoder 30 may read the slice headers and/or end-of-slice symbols of a received NAL unit to determine that an encoded slice begins in the middle of a wavefront, and that the slice also ends within the same wavefront in which the slice begins. In some examples, video encoder 20 may determine that two or more slices begin in the middle of a single wavefront. In such examples, video encoder 20 may determine whether the last such slice spills over into a subsequent wavefront, and implement the restrictions described herein with respect to the last such wavefront.

In this manner, a restriction may be imposed that any slice that begins at a CTU, or other block, other than the ordinal first CTU of a wavefront, will end within the wavefront. By implementing these restrictions, a video coder, such as video encoder 20 and/or video decoder 30, may improve efficiency in implementing WPP. More specifically, the video coder may implement the restrictions to ensure that, while coding a CTU of a current wavefront, the video coder has access to any data of previous wavefronts that may be necessary for coding the current CTU. That is, slice header data for a slice including a current CTU may be guaranteed to be available when entropy coding one or more syntax elements of the current CTU, such that the video coder can determine context for entropy coding the syntax elements correctly.

In some examples, a slice may begin at the first CTU of a first wavefront, and cross the boundary into a second wavefront positioned immediately below the first wavefront. In such examples, the slice may include multiple CTUs of the second wavefront, but may terminate within the second wavefront. In other words, the second wavefront may include additional CTUs that belong to a different, second slice.

In this example, while coding a CTU of the slice that is positioned in the second wavefront, the video coder may have access to all data from the first wavefront that is necessary for the coding process. That is, the video coder will have already coded the slice header data during coding of the previous wavefront, and therefore, a slice that begins at the ordinal first CTU of a wavefront may still be permitted to cross the wavefront boundary to a subsequent wavefront. Additionally, using the restrictions described herein, the video coder may ensure that the second slice terminates within the second wavefront. For instance, if the video coder determines that the second slice begins in the middle of the second wavefront and thus ends with the last CTU of the second wavefront, the video coder may finish coding the second wavefront synchronously with finishing coding the second slice. As a result, the beginning of a third wavefront would, by definition, coincide with the beginning of a third slice. More specifically, the first (leftmost) CTU of the third wavefront would represent the first CTU of the third slice. If the third slice crosses boundary into fourth (or greater) wavefront, the video coder may have consistent access to coding-critical data from portions of the third slice positioned in previous wavefronts, thereby improving the video coder's ability to perform WPP. In this manner, a video coder may implement the techniques of this disclosure to code a current slice such that, while implementing WPP, subsequent slices are coded efficiently in accordance with WPP.

A video coder, such as video encoder 20 and/or video decoder 30, may activate the restriction(s) based on whether or not the video coder is currently implementing WPP. As one example, video decoder 30 may determine whether WPP is currently enabled using syntax data of the bitstream indicative of whether WPP is enabled. Similarly, video encoder 20 may encode syntax data representing whether WPP is enabled. Such syntax data may be coded in a video parameter set (VPS), a sequence parameter set (SPS), a picture parameter set (PPS), supplemental enhancement information (SEI) messages, or the like. In this example, in response to determining that WPP is enabled, video encoder 20 may entropy encode, and video decoder 30 may entropy decode, a picture using WPP, while observing the slice-wavefront restrictions described above. In some implementations, a video coder may enable WPP, e.g., in response to determining that WPP is currently disabled.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CO-DEC). A device including video encoder 20 and/or video decoder 30 may comprise an integrated circuit, a microprocessor, and/or a wireless communication device, such as a cellular telephone.

Figure 2:
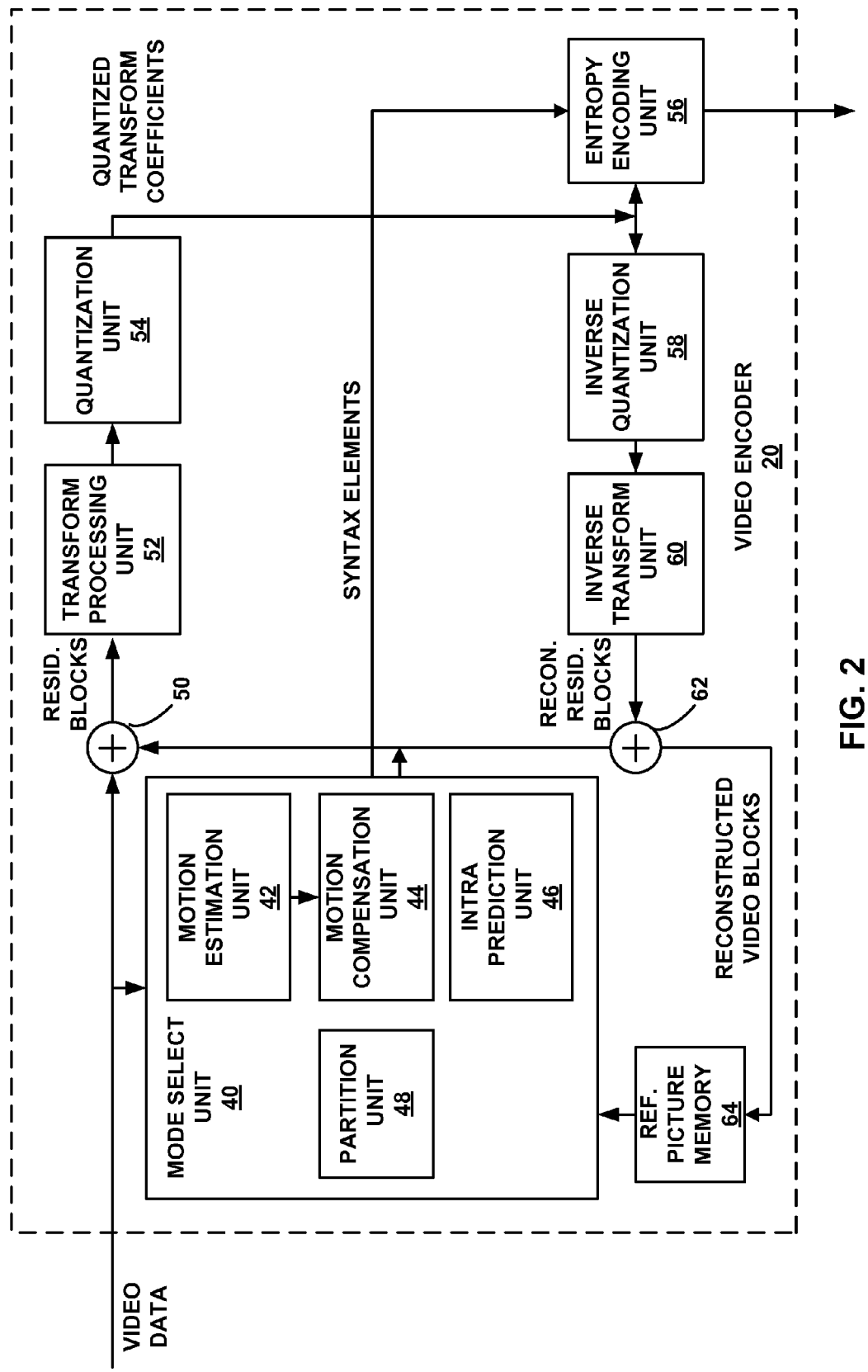
FIG. 2 is a block diagram illustrating an example of a video encoder that may implement techniques for coding wavefronts in parallel.

FIG. 2 is a block diagram illustrating an example of video encoder 20 that may implement techniques for coding wavefronts in parallel. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy encoding, context may be based on neighboring blocks. Following the entropy coding by entropy encoding unit 56, the encoded bitstream may be transmitted to another device (e.g., video decoder 30) or archived for later transmission or retrieval.

In examples, entropy encoding unit 56 may entropy encode the quantized transform coefficients using wavefront parallel processing (WPP). As described with respect to FIG. 1, WPP may include entropy encoding the quantized transform coefficients in parallel. For instance, entropy encoding unit 56 may arrange the quantized transform coefficients into multiple rows, or wavefronts. In turn, entropy encoding unit 56 may encode each coefficient using syntax elements received from mode select unit 40, such as one or more motion vectors associated with neighboring coefficients. In terms of encoding using WPP, entropy encoding unit 56 may, for a coefficient at any position other than a beginning or end of a wavefront, use motion vectors associated with coefficients that are positioned to the left, above-left, above, and above-right of the coefficient to be encoded.

To improve the efficiency of WPP-based entropy encoding, entropy encoding unit 56 may implement techniques of this disclosure to restrict traditional slice-wavefront interaction with respect to the quantized transform coefficients. As described, a video coder, such as video encoder 20, may divide an image, or data representative of the image, into multiple slices. In terms of FIG. 2, the stream of quantized transform coefficients may be divided into multiple slices. In turn, a slice may cover varying portions of one or more wavefronts demarcated by entropy encoding unit 56. For example, a first slice may cover the entirety of a first wavefront and an incomplete portion of a second wavefront. A second slice may cover the remainder of the second wavefront not covered by the first slice, and an incomplete portion of a third wavefront. In this manner, traditional slice-wavefront interaction as provided by WPP may not correlate the starting/ending points of a slice to those of a wavefront.

To improve efficiency of entropy encoding in accordance with WPP, entropy encoding unit 56 may implement one or more techniques of this disclosure. For instance, entropy encoding unit 56 may determine, based on the quantized transform coefficients received from quantization unit 54, that a slice of a picture of video data begins in a wavefront, i.e., a row of coding tree units (CTUs), in the picture at a position other than a beginning of the wavefront. Based on the determination, entropy encoding unit 56 may determine that the slice ends within the wavefront, and code the slice based on the determination. More specifically, entropy encoding unit 56 may terminate the slice at the last coefficient of the wavefront, such as by inserting an end-of-slice symbol in a NAL unit upon encoding the last coefficient of the wavefront. In this manner, entropy encoding unit 56 may ensure that, while coding a particular CTU, entropy encoding unit 56 has access to all information for coding the particular CTU in accordance with WPP, and that the slice header data for the particular CTU has been entropy encoded already.

Additionally, entropy encoding unit 56 may insert a slice header in the NAL unit before encoding the first coefficient of the next wavefront. In this instance, entropy encoding unit 56 may encode the stream of quantized transform coefficients such that the beginning of the next wavefront coincides with the beginning of a separate slice. If the new slice encompasses the entire second wavefront and spills over to a third wavefront, entropy encoding unit 56 may have access to all of the data necessary to efficiently code the third wavefront in accordance with WPP. More specifically, entropy encoding unit 56 may ensure that the slice header for all CTUs of the third wavefront have been entropy encoded before any CTU of the third wavefront is to be entropy encoded.

In a specific example, while coding the second coefficient of the third wavefront, entropy encoding unit 56 may access, from the syntax elements sent by mode select unit 40, motion vectors that identify the first coefficient of each of the second and third wavefronts (i.e., the left and above-left coefficients of the current coefficient), the second coefficient of the second wavefront (i.e., the coefficient positioned immediately above the current coefficient), and the third coefficient of the second wavefront (i.e., the coefficient positioned to the above-right of the current coefficient). Additionally, the slice header for the second coefficient has been entropy encoded already, as the slice header coincides with the first coefficient of the second wavefront. In this manner, entropy encoding unit 56 may implement the techniques of this disclosure to encode a current slice such that encoding a subsequent slice using WPP is more efficient.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

As described above, video encoder 20 represents an example of a video coder configured to determine that a slice of a picture of video data begins in a row of coding tree units (CTUs) in the picture at a position other than a beginning of the row, based on the determination, determine that the slice ends within the row of CTUs, and code the slice based on the determination that the slice ends within the row of CTUs. In examples, video encoder 20 may be included in a device for coding video data, such as a desktop computer, notebook (i.e., laptop) computer, tablet computer, set-top box, telephone handset such as a so-called "smart" phone, so-called "smart" pad, television, camera, display device, digital media player, video gaming console, video streaming device, or the like. In examples, such a device for coding video data may include one or more of an integrated circuit, a microprocessor, and a communication device that includes video encoder 20.

Figure 3:
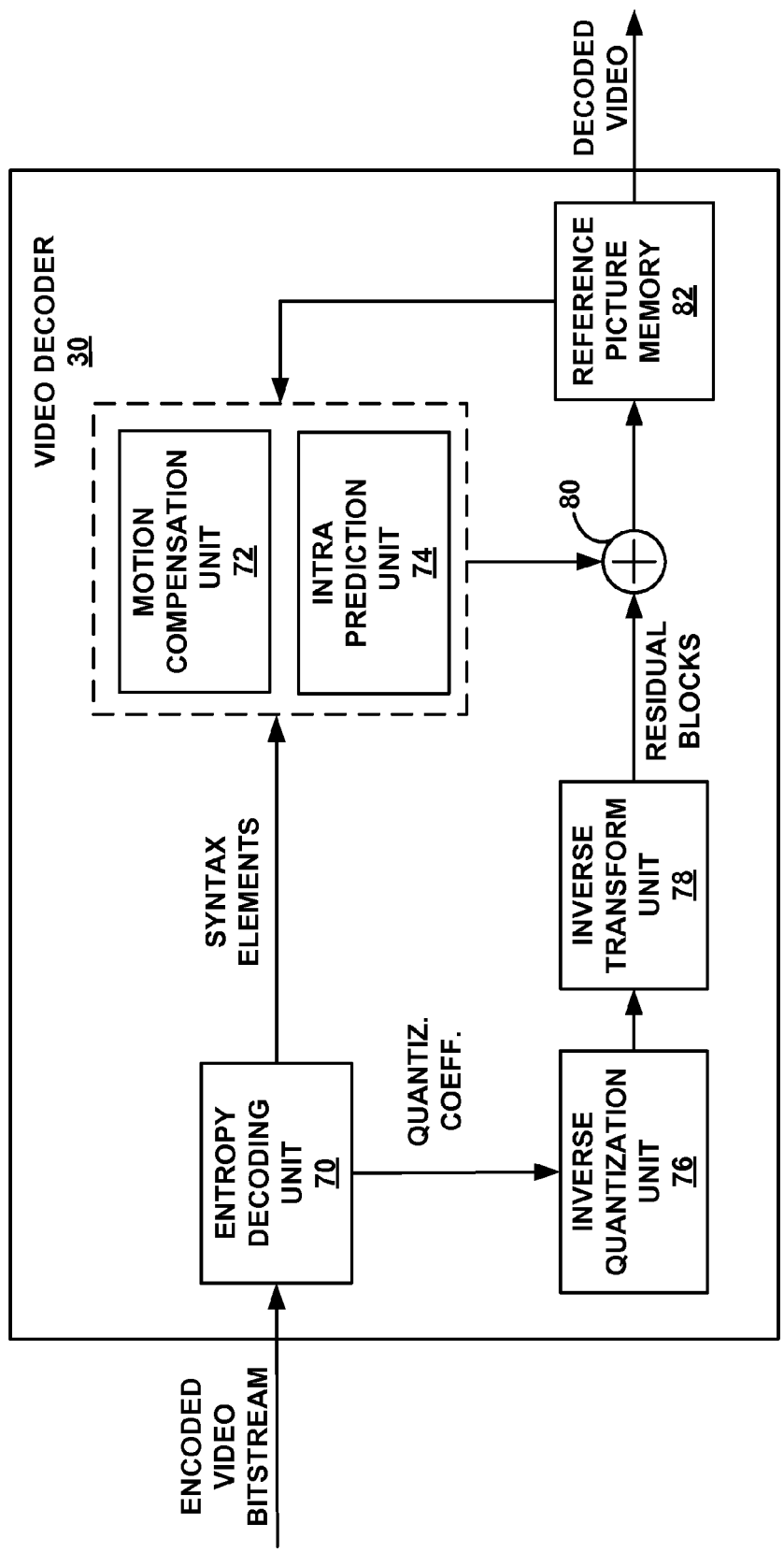
FIG. 3 is a block diagram illustrating an example of a video decoder that may implement techniques for coding wavefronts in parallel.

FIG. 3 is a block diagram illustrating an example of video decoder 30 that may implement techniques for coding wavefronts in parallel. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

Entropy decoding unit 70 may implement the techniques of this disclosure to restrict slice-wavefront interaction to more efficiently entropy decode an image using wavefront parallel processing (WPP). For instance, entropy decoding unit 70 may determine that a slice begins in the middle of a wavefront, such as by determining that a slice header in a received NAL unit coincides with a CTU that is not the first CTU of its respective wavefront. Based on the determination, entropy decoding unit 70 may determine that the slice ends within the same wavefront, e.g., by determining that the received NAL unit includes an end-of-slice symbol at the end of the last CTU of the current wavefront.

By restricting slice-wavefront interaction in this manner, entropy decoding unit 70 may entropy decode an image more efficiently using WPP. For instance, entropy decoding unit 70 may ensure that, while decoding a particular CTU, entropy decoding unit 70 has access to all information necessary to decode the particular CTU using WPP, and that the slice header for the particular CTU has already been entropy decoded by the time entropy decoding unit 70 is ready to decode the particular CTU. In this manner, entropy decoding unit 70 may implement the techniques of this disclosure to more efficiently decode an image in accordance with WPP.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 represents an example of a video coder configured to determine that a slice of a picture of video data begins in a row of coding tree units (CTUs) in the picture at a position other than a beginning of the row, based on the determination, determine that the slice ends within the row of CTUs, and code the slice based on the determination that the slice ends within the row of CTUs. In examples, video decoder 30 may be included in a device for coding video data, such as a desktop computer, notebook (i.e., laptop) computer, tablet computer, set-top box, telephone handset such as a so-called "smart" phone, so-called "smart" pad, television, camera, display device, digital media player, video gaming console, video streaming device, or the like. In examples, such a device for coding video data may include one or more of an integrated circuit, a microprocessor, and a communication device that includes video decoder 30.

Figure 4:
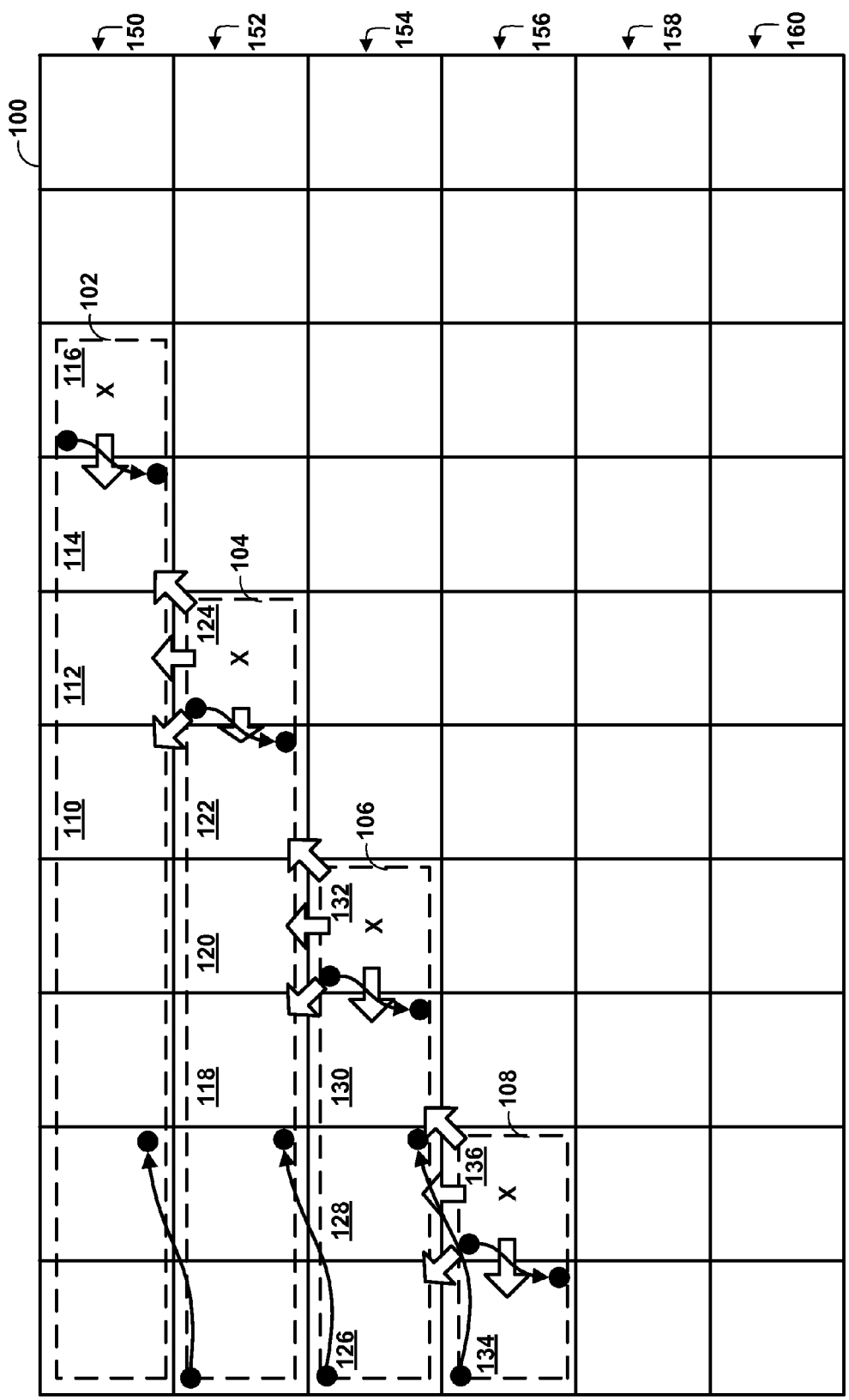
FIG. 4 is a conceptual diagram illustrating an example picture divided into wavefronts.

FIG. 4 is a conceptual diagram illustrating an example picture 100 divided into wavefronts 150-160. Each of wavefronts 150-160 includes a number of blocks. It should be noted that picture 100 may include additional wavefronts, and that each wavefront may include additional blocks than those shown. Each of the blocks may correspond to, for example, a CTU.

A video coder, such as video encoder 20 or video decoder 30, may be configured to code wavefronts 150-160 in parallel. Video encoder 20 may begin coding a wavefront after two blocks of the above wavefront have been coded. FIG. 4 illustrates the blocks after which a wavefront may be coded using black dots connected by a relatively horizontal curved arrow. For example, block 134 of wavefront 156 may be coded after block 128 of wavefront 154 has been coded. As an example, a video coder may code each of the blocks marked with an "X," that is, blocks 116, 124, 132, and 136, in parallel. Dashed lines 102, 104, 106, and 108 represent blocks that have been parsed and from which information is available for retrieval at a particular coding time, in the example of FIG. 4. The particular coding time may correspond to the time at which the blocks marked with an "X," that is, blocks 116, 124, 132, and 136, are coded.

Accordingly, the video coder may retrieve context information for a block marked with an "X" from the blocks pointed to by solid white arrows in FIG. 4. As shown in FIG. 4, each of the blocks to which a solid white arrow points is within one of dashed lines 102, 104, 106, and 108. For example, a video coder may retrieve context information for block 116 from block 114; the video coder may retrieve context information for block 124 from blocks 110, 112, 114, and/or 122; the video coder may retrieve context information for block 132 from blocks 118, 120, 122, and/or 130; and the video coder may retrieve context information for block 136 from blocks 126, 128, 130, and/or 134. Collectively, dashed lines 102, 104, 106, and 108 include a CTU group, i.e., a collection of blocks of picture 100 that the video coder is capable of coding at a given time in accordance with WPP.

In accordance with the techniques of this disclosure, each of wavefronts 150-160 may include portions or entireties of one or more slices. Alternatively, a slice may include portions or entireties of one or more wavefronts, such as one or more of wavefronts 150-160. For example, a first slice may include blocks of wavefronts 150 and 152, a second slice may include blocks of wavefronts 152, 154 and 156, and a third slice may include blocks of wavefronts 158 and 160. In this manner, when a slice crosses a boundary between two wavefronts, the slice may include some or all blocks of the two wavefronts.

Suppose, for example, that a video coder is to code block 132. In order to initialize a context state for wavefront 154, which includes block 132, a video coder may need one or more parameters of a slice header for a slice including block 132. If the slice were permitted to begin at a block in the middle of wavefront 152 and cross the boundary between wavefront 152 and wavefront 154, the video coder may have to wait to code the first block in the slice to retrieve the information of the slice header. For example, if the slice were to begin at the horizontal position of the block in wavefront 152 below block 116, this block would not yet have been parsed, and thus, the video coder would need to wait until the block was parsed before the video coder could begin coding wavefront 154. However, the video coder may implement techniques of this disclosure to provide that, if a slice begins in a wavefront of picture 100 at a position other than the beginning of the wavefront, then the slice ends within that particular wavefront. In other words, any wavefront of picture 100 may either begin with a slice header, or end with an end-of-slice symbol (or both). By restricting slice-wavefront interaction in this way, the video coder may ensure that, while coding a particular block of picture 100, the video coder has access to all information needed to code the block in accordance with WPP, and that the slice header corresponding to the block has already been coded. Thus, the video coder may prevent occurrences of situations that require the video coder to wait to code a block in accordance with wavefront parallel processing (WPP).

More specifically, a video coder may implement the techniques to ensure that all data needed for coding the block in accordance with wavefront parallel processing (WPP), e.g., using CABAC, is available, and that the block is ready to be coded in that the slice header for the block has been coded already. Although a variety of video coders may implement the techniques, for purposes of explanation, one or more of the techniques are described with reference to video encoder 20 of FIG. 2 and video decoder 30 of FIG. 3, and their respective components. For instance, entropy decoding unit 70 of video decoder 30 may restrict slice-wavefront interaction within picture 100 to ensure that all data needed for coding a block according to WPP is available and that the corresponding slice header for the block has already been coded. For instance, entropy decoding unit 70 may determine that a slice of picture 100 begins in wavefront 150, but at a position other than the beginning of wavefront 150 (e.g., at block 110). Based on the determination, entropy decoding unit 70 may determine that the slice ends within wavefront 150. For instance, entropy decoding unit 70 may detect, in a received NAL unit representing portions of picture 100, an end-of-slice symbol immediately following the last encoded block of wavefront 150, and detect a slice header immediately preceding the first encoded block of wavefront 152. In this manner, video encoder 20 and/or video decoder 30 may ensure that the slice header for any particular block of wavefront 152 has been coded before the particular block is ready to be coded.

In the context of encoding picture 100 in accordance with WPP, entropy encoding unit 56 of video encoder 20 may detect that the slice beginning at block 110 also includes one or more blocks of wavefront 152. This concept is referred to herein as "slice spillover." In this instance, entropy encoding unit 56 may terminate the slice after including the last block of wavefront 150, and initiate a new slice that includes the first block of wavefront 152. As described, entropy encoding unit 56 may generate a NAL unit that includes encoded data representing picture 100, and insert an end-of-slice symbol after data representing the last block of wavefront 150 (as encoded). Similarly, entropy encoding unit 56 may insert, in the same or subsequent NAL unit, a slice header immediately preceding data that represents the first block of wavefront 152 as encoded. By implementing these restrictions, video encoder 20 may ensure that the slice header for a given block of wavefronts 150 and/or 152 has been coded before the given block is ready to be coded. In this manner, video encoder 20 may implement techniques of this disclosure to restrict slice-wavefront interaction to utilize WPP more efficiently, and to enable video decoder 30 to utilize WPP more efficiently as well.

In this manner, a video coder may determine that a slice of picture 100 begins in a row of CTUs in picture 100 other than a beginning of the row. Based on the determination, the video coder may determine that the slice ends within the row of CTUs, and code the slice based on the determination that the slice ends within the row of CTUs.

As discussed above, in some examples, a video coder, such as video encoder 20 or video decoder 30, may be configured to code video data such that, when a slice of the video data includes a first row of coding tree units (CTUs) comprising a full row, and a portion of a second row of CTUs, the second row comprising fewer CTUs than the full row, the slice begins at the beginning of the at least one full row of largest coding units. For example, suppose that a slice begins at the beginning of wavefront 150. In this example, the slice may end in the middle of (that is, before the end of) a subsequent wavefront, e.g., wavefront 152.

Suppose, for example, that the slice ends at block 120. This would be permitted by the restriction described above, because the slice starts at the beginning of a wavefront, namely wavefront 150 in this example. Thus, a subsequent slice may start at block 122. However, this slice would not be permitted to cross the boundary at the end of wavefront 152, in this example. Thus, the slice would end at the end of wavefront 152. Of course, additional slices may be added within wavefront 152, so long as a slice does not cross the boundary between wavefront 152 and wavefront 154, in this example.

Figure 5:
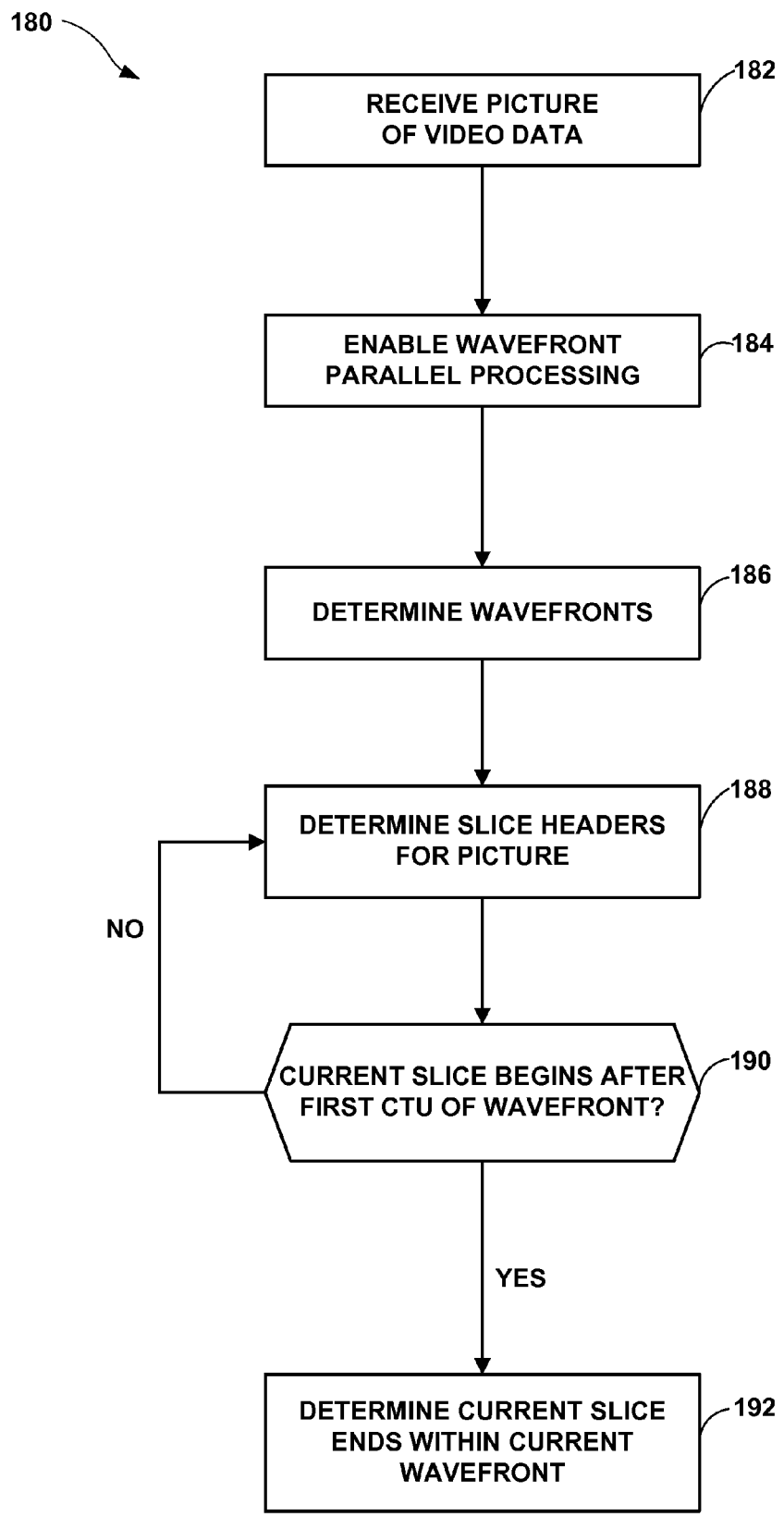
FIG. 5 is a flowchart illustrating an example process by which a video coder may implement techniques of this disclosure for coding wavefronts in parallel.

FIG. 5 is a flowchart illustrating an example process 180 by which a video coder may implement techniques of this disclosure for coding wavefronts in parallel. FIG. 5 illustrates example process 180 by which a video coder, such as video encoder 20, may encode a picture, such as a frame of video data, using one or more techniques of this disclosure. While process 180 may be performed by a variety of devices in accordance with the aspects of this disclosure, for purposes of explanation, process 180 is described herein with respect to the devices of FIGS. 1-2 and their respective components, as well as picture 100 of FIG. 4. Process 180 may begin when a device receives a picture of video data (182). As one example, source device 12 may receive picture 100 via one or more input devices.

Additionally, source device 12 may enable wavefront parallel processing (WPP) (184). For instance, source device 12 may enable WPP, thereby causing video encoder 20 to encode picture 100 in accordance with WPP. A video coder, such as video encoder 20 may determine wavefronts of picture 100 (186). For instance, video encoder 20 may determine a number of blocks (e.g., CTUs) per wavefront associated with the WPP-based encoding of picture 100, and determine a wavefront transition upon reaching every integer-multiple of the number of blocks.

Additionally, video encoder 20 may determine slice headers for picture 100 (188). More specifically, video encoder 20 may use slice headers to indicate a slice transition, i.e., the beginning of a new slice of picture 100. For instance, video encoder 20 may insert a slice header at a particular portion of picture 100 that corresponds to the start of a new slice. In some examples, video encoder 20 may indicate the slice transition based on an end-of-slice symbol, such as by inserting an end-of-slice symbol at a portion of picture 100 to denote the end of a slice. In some examples, video encoder 20 may indicate the slice transition using a sequence of an end-of-slice symbol followed immediately by a slice header, such as by inserting an end-of-slice symbol to denote the end of a slice, and inserting a slice header immediately following the end-of-slice symbol, to denote the start of a new slice.

The video coder may determine whether the current slice begins after the first CTU of a wavefront (190). For instance, video encoder 20 may determine that the current slice begins after the first CTU of wavefront 150 (e.g., in the "middle" of the wavefront), if video encoder 20 detects, or inserts, a slice header at block 110. In this example, if video encoder 20 determines that the current slice begins after the first CTU of the wavefront ("YES" branch of 190), then video encoder 20 may determine that the current slice ends within the current wavefront (192). For instance, video encoder 20 may determine that the current slice ends within wavefront 150 by placing an end-of-slice symbol in the generated NAL unit before demarcating a transition to wavefront 152. By determining the described slice transitions, video encoder 20 may guarantee that video encoder 20 (and/or video decoder 30) has access to all information necessary to code a block of wavefront 152, and that the slice header for the block has already been coded.

On the other hand, if the video coder determines that the current slice does not begin after the first CTU of a wavefront i.e., the slice header coincides with the first CTU of the wavefront ("NO" branch of 190), the video coder may continue to determine the slice headers for picture 100 (188). For instance, video encoder 30 may encode subsequent slice headers (and/or end-of-slice symbols), based on determining that the current slice begins at the beginning of a wavefront. In this manner, video encoder 20 may implement process 180 to restrict slice-wavefront interaction in such a way that the video encoder 20 and video decoder 30 have access to all of the data necessary (including an already-coded slice header) to efficiently code a current CTU, in accordance with WPP.

Figure 6:
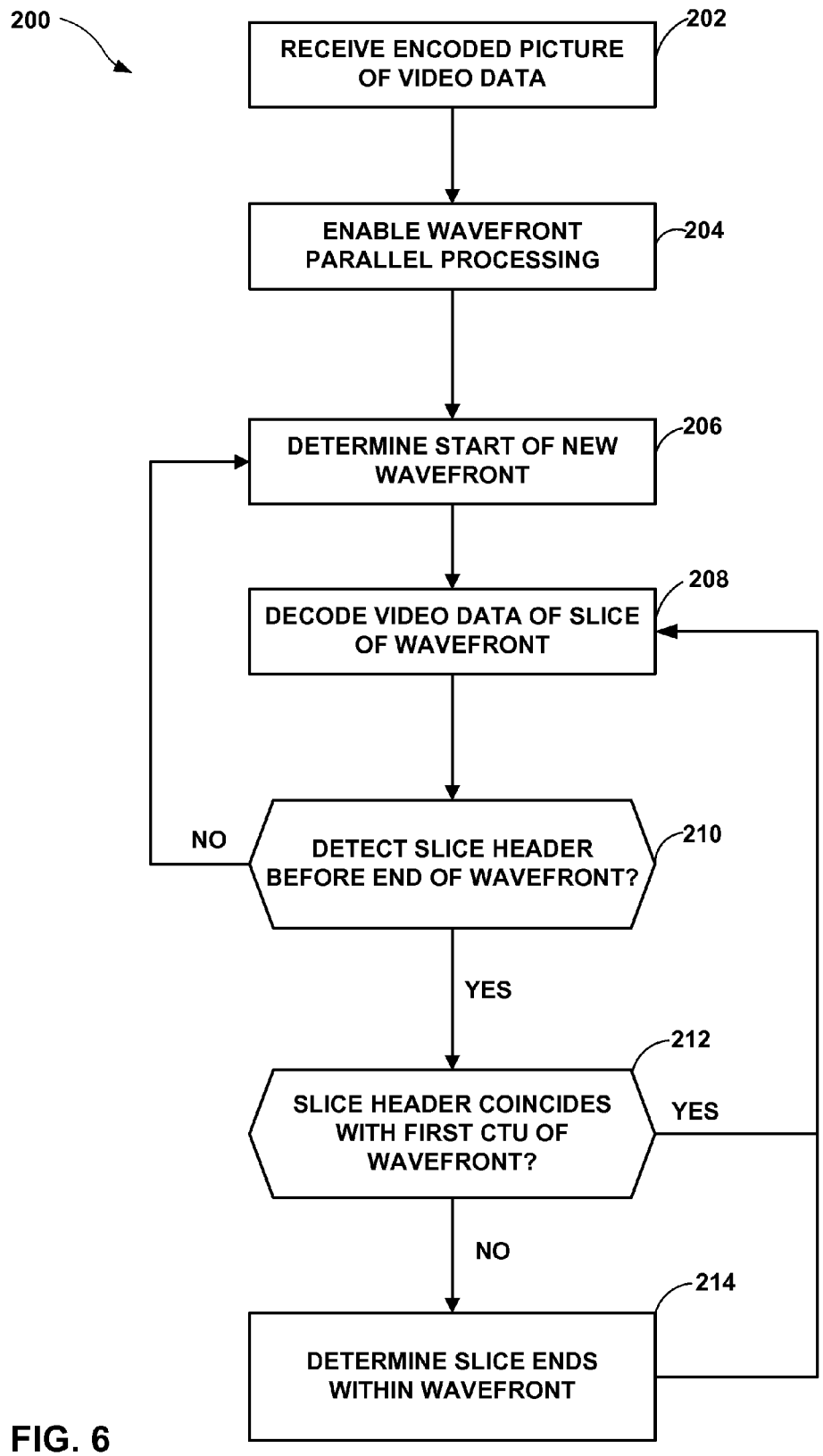
FIG. 6 is a flowchart illustrating another example process by which a video coder may implement techniques of this disclosure for coding wavefronts in parallel.

FIG. 6 is a flowchart illustrating another example process 200 by which a video coder may decode an encoded picture, such as a frame of video data, using one or more techniques of this disclosure. While process 200 may be performed by a variety of devices in accordance with the aspects of this disclosure, for purposes of explanation, process 200 is described herein with respect to the devices of FIGS. 1 and 3, and their respective components, as well as picture 100 of FIG. 4. Process 200 may begin when video decoder 30 receives an encoded picture of video data (202). As one example, destination device 14 may receive an encoded version of picture 100 at input interface 128.

Additionally, video decoder 30 may enable wavefront parallel processing (WPP) (204). In some examples, computer-readable medium 16 may include signaling data indicating that WPP is to be enabled. Conversely, in other examples, video decoder 30 may determine an implicit indication to enable WPP, based on whether video data included in computer-readable medium 16 conforms to a particular standard and/or a particular profile of a standard. For instance, destination device 14 may enable WPP to cause video decoder 30 to decode the received encoded version of picture 100 in accordance with WPP. Additionally, video decoder 30 may determine the start of a new wavefront of encoded picture 100 (206). For instance, video decoder 30 may determine that the first block (e.g., CTU) of encoded picture 100 indicates the start of new wavefront 150. Additionally, video decoder 30 may determine a number of CTUs per wavefront associated with the WPP-based encoding of picture 100, and determine the start of a new wavefront (or "wavefront transition") upon reaching every integer-multiple of the number of CTUs.

Video decoder 30 may decode video data of the current slice of the current wavefront (e.g., wavefront 150) of encoded version of picture 100 (208). More specifically, video decoder 30 may decode wavefront 150 on a per-CTU basis, starting at the leftmost CTU, then decoding the next CTU to the right, and so on. Additionally, video decoder 30 may determine whether or not video decoder 30 detects a slice header before reaching the end (e.g., the rightmost CTU) of wavefront 150 (210). Video decoder 30 may determine the start of a new slice of encoded picture 100, or a "slice transition," based on detecting a slice header in encoded picture 100. If video decoder 30 does not detect a slice header before the end of wavefront 150 ("NO" branch of 210), video decoder 30 may detect the start of new wavefront 152 (206). More specifically, in this scenario, video decoder 30 may determine that at least part of wavefront 152, including the first CTU of wavefront 152, belongs to the same slice as the CTUs of wavefront 152.

Conversely, if video decoder 30 detects a slice header before the end of wavefront 150 ("YES" branch of 210), video decoder 30 may determine whether the slice header coincides with the first CTU of wavefront 150 (212). In other words, video decoder 30 may determine whether the current slice begins at the same CTU as current wavefront 150. If video decoder 30 determines that the detected slice header coincides with the first CTU of wavefront 150 ("YES" branch of 212), video decoder 30 may continue to decode video data of the current slice of wavefront 150 (208).

On the other hand, if video decoder 30 determines that the detected slice header does not coincide with the first CTU of wavefront 150 ("NO" branch of 212), video decoder 30 may determine that the current slice ends within wavefront 150 (214). More specifically, video decoder 30 may determine that current slice ends within (e.g., at or before the last/rightmost CTU of) wavefront 150 based on the slice-wavefront interaction restrictions enabled by techniques of this disclosure. Additionally, based on determining that the current slice ends within wavefront 150, video decoder may continue to decode video data of the current slice of wavefront 150.

By restricting slice-wavefront interaction in the manner illustrated in FIG. 6, video decoder 30 may ensure that, while decoding a CTU of the slice that is positioned in a wavefront, such as wavefront 152, video decoder 30 has access to all data from wavefront 150 that is necessary for the decoding process for wavefront 152. That is, video decoder 30 will have either already decoded the slice header data for a slice in wavefront 152 during decoding of wavefront 150, or the slice header for the slice in wavefront 152 will occur at the beginning of wavefront 152, and therefore, video decoder 30 can begin decoding wavefront 152 based on having access to all necessary decoding-critical data in accordance with WPP.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding encoded video data, the method comprising:
   receiving an encoded video bitstream comprising an encoded picture that is divided into a plurality of coding tree units (CTUs), the plurality of CTUs being arranged in multiple rows, each respective row of CTUs spanning a width of the picture, the width of the picture beginning at a left edge of the encoded picture and ending at a right edge of the encoded picture;
   determining that the encoded picture includes one or more slices that begin in a respective row of CTUs of the encoded picture, at a position other than a beginning of the respective row;
   determining that each slice of the one or more slices that begin at the position other than the beginning of the respective row of CTUs ends within the respective row of CTUs, such that no slice of the one or more slices that begin at the position other than the beginning of the respective row of CTUs crosses into a subsequent row of CTUs of the encoded picture, wherein the beginning of each respective row corresponds to the left edge of the encoded picture, and wherein an end of each respective row corresponds to the right edge of the encoded picture; and
   based on the determination that each slice of the one or more slices that begin at the position other than the beginning of the respective row of CTUs ends within the respective row of CTUs, parsing the encoded video bitstream to decode slice partition syntax elements from each respective row of CTUs in which a respective slice starts at the position other than the beginning, wherein the slice partition syntax elements demarcate the slice that ends within the respective row of CTUs from a subsequent slice of the encoded picture, and wherein the subsequent slice starts either in the respective row of CTUs or in a respective subsequent row of CTUs that follows the respective row of CTUs.

2. The method of claim 1, wherein the encoded picture is included in a plurality of encoded pictures of the encoded video bitstream, the method further comprising decoding all slices of all encoded pictures of the encoded video bitstream such that all of the slices that begin at a position other than a beginning of a corresponding row of CTUs also end within the corresponding row of CTUs.

3. The method of claim 1, further comprising decoding the multiple rows of CTUs of the encoded picture using wavefront parallel processing.

4. The method of claim 3, wherein decoding the multiple rows of CTUs of the encoded picture using wavefront parallel processing further comprises determining that wavefront parallel processing is enabled with respect to decoding the encoded picture.

5. The method of claim 3, further comprising enabling wavefront parallel processing with respect to decoding the encoded picture.

6. The method of claim 5, further comprising decoding syntax data indicating that wavefront parallel processing is enabled with respect to decoding the encoded picture.

7. The method of claim 1, further comprising decoding the CTUs of the current each slice of the one or more slices that begin at the position other than the beginning of the respective row of CTUs in raster scan order without crossing to the respective subsequent row of CTUs in the encoded picture before reaching the slice partition syntax elements that demarcate the slice that ends within the respective row of CTUs from the subsequent slice of the encoded picture.

8. The method of claim 1, further comprising decoding a portion of a first row of the multiple rows of CTUs in parallel with decoding a portion of a second row of the multiple rows of CTUs.

9. The method of claim 8, wherein the second row of CTUs is positioned adjacent to and below the first row of CTUs in the encoded picture.

10. The method of claim 8, wherein the second row of CTUs is positioned adjacent to and above the first row of CTUs in the encoded picture.

11. The method of claim 1, further comprising:
    receiving the encoded video bitstream; and
    entropy decoding all of the multiple rows of CTUs of the encoded picture based on the determination that no slice of the one or more slices that begin at the position other than the beginning of the respective row of CTUs crosses into a subsequent row of CTUs of the encoded picture.

12. The method of claim 1, further comprising:
    based on the determination that each of the of the one or more slices that begin at the position other than the beginning of the respective row of CTUs ends within the respective row of CTUs, initializing respective context-adaptive binary arithmetic coding (CABAC) probabilities for the subsequent slice using a slice header of the subsequent slice.

13. The method of claim 1, wherein the slice partition syntax elements include at least one of: (i) one or more end-of-slice symbols indicating an end of the slice that ends within the respective row of CTUs, or (ii) slice header syntax elements indicating a beginning of the subsequent slice.

14. A device for decoding encoded video data, the device comprising:

an interface configured to receive an encoded video bitstream comprising an encoded picture that is divided into a plurality of coding tree units (CTUs), the plurality of CTUs being arranged in multiple rows, each respective row of CTUs spanning a width of the picture the width of the picture beginning at a left edge of the encoded picture and ending at a right edge of the encoded picture;

a memory coupled to the interface, the memory being configured to store the encoded picture; and one or more processors coupled to the memory, the one or more processors being configured to:

determine that the encoded picture stored to the memory includes one or more slices that begin in a respective row of CTUs of the encoded picture, at a position other than a beginning of the respective row;

determine that each slice of the one or more slices that begin at the position other than the beginning of the respective row of CTUs ends within the respective row of CTUs, such that no slice of the one or more slices that begin at the position other than the beginning of the respective row of CTUs crosses into a subsequent row of CTUs of the encoded picture, wherein the beginning of each respective row corresponds to the left edge of the encoded picture, and wherein an end of each respective row corresponds to the right edge of the encoded picture; and based on the determination that each slice of the one or more slices that begin at the position other than the beginning of the respective row of CTUs ends within the respective row of CTUs, parse the video bitstream to code slice partition syntax elements from each respective row of CTUs in which a respective slice starts at the position other than the beginning, wherein the slice partition syntax elements demarcate the slice that ends within the respective row of CTUs from a subsequent slice of the encoded picture, and wherein the subsequent slice starts either in the respective row of CTUs or in a respective subsequent row of CTUs that follows the respective row of CTUs.

15. The device of claim 14, further comprising at least one of:
one or more integrated circuits;
one or more microprocessors;
one or more digital signal processors (DSPs);
one or more field programmable gate arrays (FPGAs);
a desktop computer;
a laptop computer;
a tablet computer;
a phone;
a television;
a camera;
a display device;
a digital media player;
a video game console;
a video game device;
a video streaming device; or
a wireless communication device.

16. The device of claim 14, wherein the encoded picture is included in a plurality of encoded pictures of the encoded video bitstream, and wherein the one or more processors are further configured to decode all encoded slices of all pictures of the encoded video bitstream such that all of the slices that begin at a position other than a beginning of a corresponding row of CTUs also end within the corresponding row of CTUs.

17. The device of claim 14, wherein the one or more processors are further configured to decode the multiple rows of CTUs of the encoded picture using wavefront parallel processing.

18. The device of claim 17, wherein to decode the multiple rows of CTUs of the encoded picture using wavefront parallel processing, the one or more processors are configured to determine that wavefront parallel processing is enabled on the device with respect to decoding the encoded picture.

19. The device of claim 17, wherein the one or more processors are further configured to enable wavefront parallel processing on the device, with respect to decoding the encoded picture.

20. The device of claim 14, wherein the one or more processors are further configured to decode the CTUs of each slice of the one or more slices that begin at the position other than the beginning of the respective row of CTUs in raster scan order without crossing to the respective subsequent row of CTUs in the encoded picture before reaching the slice partition syntax elements that demarcate the slice that ends within the respective row of CTUs from the subsequent slice of the encoded picture.

21. The device of claim 14, wherein the one or more processors are further configured to decode a portion of a first row of the multiple rows of CTUs in parallel with decoding a portion of a second row of the multiple rows of CTUs.

22. The device of claim 21, wherein the second row of CTUs is positioned adjacent to and below the first row of CTUs in the encoded picture.

23. The device of claim 21, wherein the second row of CTUs is positioned adjacent to and above the first row of CTUs in the encoded picture.

24. The device of claim 14, wherein the one or more processors are further configured to entropy decode all of the multiple rows of CTUs of the encoded picture based on the determination that no slice of the one or more slices that begin at the position other than the beginning of the respective row of CTUs crosses into a subsequent row of CTUs of the encoded picture.

25. The device of claim 14, wherein the slice partition syntax elements include at least one of: (i) one or more end-of-slice symbols indicating an end of the slice that ends within the respective row of CTUs, or (ii) slice header syntax elements indicating a beginning of the subsequent slice.

26. A device for decoding encoded video data, the device comprising:
means for receiving an encoded video bitstream comprising an encoded picture that is divided into a plurality of coding tree units (CTUs), the plurality of CTUs being arranged in multiple rows, each respective row of CTUs spanning a width of the picture the width of the picture beginning at a left edge of the encoded picture and ending at a right edge of the encoded picture;
means for determining that the encoded picture includes one or more slices that begin in a respective row of CTUs of the encoded picture, at a position other than a beginning of the respective row;
means for determining that each slice of the one or more slices that begin at the position other than the beginning of the respective row of CTUs ends within the respective row of CTUs, such that no slice of the one or more slices that begin at the position other than the beginning of the respective row of CTUs crosses into a subsequent row of CTUs of the encoded picture, wherein the beginning of each respective row corresponds to the left edge of the encoded picture, and wherein an end of each respective row corresponds to the right edge of the encoded picture; and means for parsing, based on the determination that each slice of the one or more slices that begin at the position other than the beginning of the respective row of CTUs ends within the respective row of CTUs the encoded video bitstream to decode slice partition syntax elements from each respective row of CTUs, wherein the slice partition syntax elements demarcate the slice that ends within the respective row of CTUs from a subsequent slice of the encoded picture, and wherein the subsequent slice starts either in the respective row of CTUs or in a respective subsequent row of CTUs that follows the respective row of CTUs.

27. The device of claim 26, wherein the encoded picture is included in a plurality of encoded pictures of the encoded video bitstream, the device further comprising means for decoding all slices of all encoded pictures of the encoded video bitstream such that all of the slices that begin at a position other than a beginning of a corresponding row of CTUs also end within the corresponding row of CTUs.

28. The device of claim 26, further comprising means for decoding the multiple rows of CTUs of the encoded picture using wavefront parallel processing.

29. The device of claim 26, further comprising means for decoding CTUs of each slice of the one or more slices that begin at the position other than the beginning of the respective row of CTUs in raster scan order without crossing to the respective subsequent row of CTUs in the encoded picture before reaching the slice partition syntax elements that demarcate the slice that ends within the respective row of CTUs from the subsequent slice of the encoded picture.

30. The device of claim 26, further comprising means for decoding a portion of a first row of the multiple rows of CTUs in parallel with decoding a portion of a second row of the multiple rows of CTUs.

31. A non-transitory computer-readable storage medium having stored thereon instructions that, when executed, cause a programmable processor of a computing device to:
receive encoded video data of an encoded video bitstream that comprises an encoded picture that is divided into a plurality of coding tree units (CTUs), the plurality of CTUs being arranged in multiple rows, each respective row of CTUs spanning a width of the picture;
determine that the encoded picture includes one or more slices that begin in a respective row of CTUs of the encoded picture, at a position other than a beginning of the respective row;
determine that each slice of the one or more slices that begin at the position other than the beginning of the respective row or CTUs ends within the respective row of CTUs, such that no slice of the one or more slices that begin at the position other than the beginning of the respective row of CTUs crosses into a subsequent row of CTUs of the encoded picture, wherein the beginning of each respective row corresponds to a left edge of the encoded picture, and wherein an end of each respective row corresponds to a right edge of the encoded picture; and
based on the determination that each slice of the one or more slices that begin at the position other than the beginning of the respective row of CTUs ends within the respective row of CTUs, parse the encoded video bitstream to decode slice partition syntax elements from each respective row of CTUs in which a respective slice starts at the position other than the beginning, wherein the slice partition syntax elements demarcate the slice that ends within the respective row of CTUs from a subsequent slice of the encoded picture, and wherein the subsequent slice starts either in the respective row of CTUs or in a respective subsequent row of CTUs that follows the respective row of CTUs.

32. The non-transitory computer-readable storage medium of claim 31, wherein the encoded picture is included in a plurality of encoded pictures of the encoded video bitstream, and wherein the instructions, when executed, further cause the programmable processor of the computing device to decode all slices of all encoded pictures of the encoded video bitstream such that all of the slices that begin at a position other than a beginning of a corresponding row of CTUs also end within the corresponding row of CTUs.

33. The non-transitory computer-readable storage medium of claim 31, wherein the instructions, when executed, further cause the programmable processor of the computing device to decode the multiple rows of CTUs of the encoded picture using wavefront parallel processing.

34. The non-transitory computer-readable storage medium of claim 31, wherein the instructions, when executed, further cause the programmable processor of the computing device to decode the CTUs of each slice of the one or more slices that begin at the position other than the beginning of the respective row of CTUs in raster scan order without crossing to the respective subsequent row of CTUs in the encoded picture before reaching the slice partition syntax elements that demarcate the slice that ends within the respective row of CTUs from the subsequent slice of the encoded picture.

35. The non-transitory computer-readable storage medium of claim 31, wherein the instructions, when executed, further cause the programmable processor of the computing device to decode a portion of a first row of CTUs of the multiple rows of CTUs in parallel with decoding a portion of a second row of CTUs of the multiple rows of CTUs.

36. A method of encoding video data, the method comprising:
determining that a picture of the video data includes one or more slices that begin a respective row of coding tree units (CTUs) in the picture at a position other than a beginning of the respective row;
determining that each slice of the one or more slices that begin at the position other than the beginning of the respective row of CTUs ends within the respective row of CTUs, such that no slice of the one or more slices that begin at the position other than the beginning of the respective row of CTUs crosses into a subsequent row of CTUs of the picture, wherein each respective row spans a width of the picture that begins at a left edge of the picture and ends at a right edge of the picture, wherein the beginning of each respective row corresponds to the left edge of the picture, and wherein an end of each respective row corresponds to the right edge of the picture; and
based on the determination that each slice of the one or more slices that begin at the position other than the beginning of the respective row of CTUs ends within the respective row of CTUs, generating an encoded video bitstream at least in part by encoding slice partition syntax elements in each respective row of CTUs in which a respective slice starts at the position other than the beginning, wherein the slice partition syntax elements demarcate the slice that ends within the respective row of CTUs from a subsequent slice of the picture, and wherein the subsequent slice starts either in the respective row of CTUs or in the subsequent row of CTUs that follows the respective row of CTUs.

* * * * *